United States Patent Office 3,025,251
Patented Mar. 13, 1962

3,025,251
RESINOUS COATING COMPOSITION
Ralph Earl Layman, Jr., Stamford, Conn., assignor to American Cyanamid Company, New York, N.Y., a corporation of Maine
No Drawing. Filed Aug. 10, 1959, Ser. No. 832,473
11 Claims. (Cl. 260—21)

This invention relates to a novel composition of matter comprising a mixture in aqueous dispersion of a water dispersible polymethyl ether of polymethylol melamine and an ammoniated salt of a dimer of an unsaturated fatty acid or an ammoniated salt of an addition reaction product of a polymerizable styrene and an unsaturated fatty acid. Still further, this invention relates to coating compositions such as primers, enamels and the like which may be utilized from an aqueous medium.

One of the objects of the present invention is to produce a water dispersion of a mixture of a water dispersible polymethyl ether of polymethylol melamine and an ammoniated derivative of a dimer of an unsaturated fatty acid or an ammoniated derivative of an addition reaction product of a polymerizable styrene and an unsaturated fatty acid. A further object of the present invention is to produce a coating composition having a plurality of applications such as a primer, a finished coating, a lacquer, an enamel and the like. These and other objects of the present invention will be discussed in greater detail hereinbelow.

THE POLYMETHYL ETHERS OF POLYMETHYLOL MELAMINES

The polymethyl ethers of polymethylol melamines are well known in the art as is the method for preparing the same. Reference is made to the U.S. Patent 2,197,-357 which discloses a process for making polyalkyl ethers of polyalkylol triazines. In order to prepare a polymethylol melamine, one would react 1 mol of melamine with at least 2 mols of formaldehyde. When one wishes to produce a fully methylolated melamine such as hexamethylol melamine, one should react at least 6 mols of formaldehyde with 1 mol of melamine. It is known in the art that in the preparation of monomers such as dimethylol melamine, trimethylol melamine, tetramethylol melamine, pentamethylol melamine and hexamethylol melamine that care must be exercised in order to produce the monomer without entering into any appreciable condensation which would result in resin formation even though only to a slightly advanced degree. These processes for the producing of monomeric materials are defined generically and specifically in the prior art and as a rule the degree of methylolation is directly related to the amount of the formaldehyde charged to the reaction sphere. As soon as methylolation has been accomplished, the reaction is stopped so as to prevent any advancement of resinification. The polymethylol melamines thus produced are then reacted with methanol in a quantity sufficient to produce the desired methyl ether. Again in this instance, exercise of care is necessary to prevent premature resinification. If a dimethylol melamine compound is reacted with 2 mols of methanol, there will result the dimethyl ether of dimethylol melamine. With the higher methylol melamines such as the trimethylol melamine, hexamethylol melamine, and the like, one may react from 2 mols of methanol to at least 6 mols of methanol depending on the number of methylol groups available for an etherification and depending on whether or not full methyl ethers are desired or whether only a partial methylation is required. One could produce for instance the dimethyl ether of tetramethylol melamine or the tetramethyl ether of tetramethylol melamine. By way of further illustration, one could produce the trimethyl ether of hexamethylol melamine or the pentamethyl ether of hexamethylol melamine or upon full etherification, one could produce the hexamethyl ether of hexamethylol melamine. For the purposes of the present invention, the hexamethyl ether of hexamethylol melamine is the preferred potential resin forming material utilized. The amount of the polymethyl ether of polymethylol melamine which may be used in the compositions of the present invention may be varied between about 10% and about 50% by weight based on the total weight of said melamine compound and said ammoniated salt. The balance of the composition will correspondingly be about 90% to about 50% by weight of the ammoniated derivative. With the compositions of the present invention are to be used as a primer coating, the amount of the polymethyl ether of polymethylol melamine to be used is preferably between about 15% and 20% by weight based on the total weight of the composition. When the compositions of the present invention are to be used as a finished coating such as an enamel, the amount of the melamine material may be varied between about 30% and 35% by weight, same basis.

Ammoniated Derivatives

The second component used in the compositions of the present invention is an ammoniated derivative of a dimer of an unsaturated fatty acid having from 14 to 24 carbon atoms, or an ammoniated derivative of an addition reaction product of a polymerizable styrene and an unsaturated fatty acid having from 14 to 24 carbon atoms. Among the fatty acids which may be used in the practice of the process of the present invention are myristoleic, palmitoleic, oleic, linoleic, linolenic, elaeostearic, licanic, ricinoleic, erucic, cetoleic, petroselic, nervonic, clupanodonic, stearolic, behenolic, brassidic and the like. These acids may be used either singly or in combination with one another. It is actually preferred to use these acids in admixture with one another particularly when these acids are derived from a glyceride oil. Practically all glyceride oils are composed of the glycerol triesters of mixed fatty acids including saturated fatty acids as well as unsaturated fatty acids. The fatty acids derived from such glyceride oils even though in admixture with saturated fatty acids will be very useful in the practice in the process of the present invention. Inasmuch as a preponderance of unsaturated fatty acids are desired, it is preferred that if fatty acid fractions of glyceride oil are to be used that they be selected from semi-drying glyceride oils and the drying glyceride oils. Illustrative of these glyceride oils from which one may derive the fatty acids used in the present invention are dehydrated castor oil, linseed oil, soya oil, and the fatty acid fraction of tall oil. These unsaturated fatty acids may be dimerized by conventional procedures or they may be reacted with a polymerizable styrene to form an addition reaction product, either of which are useful in the compositions in the present invention. In the dimerization of the fatty acids, conventional procedures are utilized. These dimer acids may be prepared according to the procedure outlined in "Paint and Varnish Production," August 1951, page 20 and ff. When it is desired to utilize the addition reaction product or the polymerizable styrene and an unsaturated fatty acid having from 14 to 24 carbon atoms, any of the fatty acids set forth hereinabove may be utilized. Among the polymerizable styrenes which may be used to form this addition reaction product are styrene per se, ring-substituted alkyl styrenes such as o-methyl styrene, m-methyl styrene, p-methyl styrene, 2,4-dimethyl styrene, 2,5-dimethyl styrene, 3,4-dimethyl styrene, or the ring-substituted halo styrene such as o-chloro styrene, m-chloro styrene, p-chloro styrene, 2,4-dichloro styrene, and the like. Additionally, one may make use of side chain substituted styrenes such as α-methyl styrene, α-chlorostyrene, and the like. Obviously, these polymerizable styrenes may be used either singly or in combination with each other. The amount of styrene used to react with the unsaturated fatty acid may be varied over a fairly wide range such as 0.5 mol of styrene compound per mol of fatty acid up to 2 mols of styrene compounds per mol of fatty acid. It is preferred that the ratio of the polymerizable styrene to the fatty acid be approximately equimolar, namely, 1 mol of styrene per mol of unsaturated fatty acid. The ultimate product produced by this addition reaction is analogous to the dimer of the fatty acid inasmuch as only one molecule of styrene attaches itself to the fatty acid at a given unsaturated linkage. When only one such linkage is available, the molecule of styrene adds on and further build-up of the chain is precluded by virtue of the fact that an insufficient quantity of styrene is present to permit such build-up. Where two or more sites are available on the fatty acid chain, one molecule of styrene can attach itself to each of the available sites or to a plurality of said sites, short of all of them. If desired, one can make use of small quantities of divinyl benzene in addition to the polymerizable styrene but not in complete substitution therefore. When it is desired to utilize divinyl benzene, one may utilize between 10% and 12% by weight based on the total weight of the vinyl compounds present. The mechanism for producing the addition reaction product of the polymerizable styrene and the unsaturated fatty acid is best accomplished by introducing the selected amount of the fatty acid into a suitable reaction vessel and heating the fatty acid to a temperature between about 120° C. and the reflux temperature of the polymerizable styrene, namely about 160° C. on the average, depending upon the particular fatty acid and depending upon the particular polymerizable styrene and while holding the fatty acid at said temperature and with constant stirring, one introduces the polymerizable styrene blended with catalytic quantities of a conventional peroxide catalyst such as ditertiary butyl peroxide into the hot fatty acid in comparatively small increments so as to achieve substantially complete addition reaction without accomplishing any significant homopolymerization of the styrene and without accomplishing any significant dimerization of the fatty acid. It is less material if one experiences dimerization of the fatty acid than if one experiences homopolymerization of the styrene inasmuch as mixtures of the dimer of the fatty acid and the addition reaction product of the polymerizable styrene and the unsaturated fatty acid may be utilized. The homopolymer styrene, however, may tend to have an adverse effect on the ultimate composition, and formation, in any significant amount, of such homopolymer should therefore be avoided. After the addition of the styrene catalyst mix has been completed, the charge is held at the temperature between about 120° C. and 160° C. and preferably between about 150° C. and 155° C. for a period of about 10 minutes to about 4 hours. For more complete control of the addition reaction, periods of 15 minutes to 1 hour are preferred. The ammoniation of the dimer or the addition reaction products can be accomplished by adding a sufficient amount of ammonium hydroxide to said dimer or said reaction product calculated on a stoichiometrical basis to substantially completely ammoniate the carboxyl groups present in said dimer or said reaction product. Conventionally, one would utilize a 28% solution of ammonia in water which may be diluted with enough of water to reduce the concentration to about a 6% solution. This ammoniation step can be accomplished either before the dimer or addition reaction product is added to the polymethyl ether of polymethylol melamine or the melamine compound may be added to the dimer or addition reaction product as produced and after thorough blending of the two components, the ammonia solution may be added and then post-ammoniation can be accomplished. It has been mentioned hereinabove that a peroxide catalyst is utilized in accomplishing the styrene-fatty acid reaction product. These peroxide catalysts are all well known in the art and a substantial plurality of them are available commercially such as benzoyl peroxide, tertiary butyl hydroperoxide, cumene hydroperoxide, and the like. As is customary, conventional catalytic quantities of these catalysts are used in the prepartion of these reaction products.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

*Example 1*

20 parts of the hexamethyl ether of hexamethylol melamine and 80 parts of the addition reaction product of dehydrated castor oil fatty acids and o-methyl styrene in a mol ratio of 1:1 are blended together in 220 parts of water to which a sufficient amount of ammonia has been added so as to completely ammoniate the methyl styrene-dehydrated castor oil fatty acids reaction product. The acid value of the mixture (prior to ammoniation) was 108; the color 5, Gardner 1933; and the viscosity F, Gardner-Holdt. The solids content was approximately 45.5%. To this solution there is added 1% of paratoluene sulfonic acid based on the total weight of the melamine reaction product. Pigments of various kinds could be incorporated into the coating composition in varying amounts according to choice. The blend is then ground for a 24-hour period in a steel ball mill. Films were drawn down on steel plates and glass plates and baked at 350° F. for 30 minutes. The resulting films had fairly good impact strength, excellent adhesion, excellent resistance to gasoline and fair to good resistance to such solvents as xylol, sodium hydroxide, and acetic acid. When subjected to a water bath for 500 hours, the performance of the film was excellent.

*Example 2*

Example 1 was repeated except that the dehydrated castor oil fatty acid methyl styrene reaction product was post-bodied to a viscosity of X+ by the addition of further quantities of ditertiary butyl peroxide after the addition of the peroxide monomeric mixture had been completed. The films were drawn down as in Example 1, baked for the same period at the same temperature, and displayed improved properties particularly in the field of solvent resistance where good to excellent performance was displayed.

*Example 3*

Into a suitable mixing vessel, there is introduced 220 parts of water, 20 parts of hexamethyl ether of hexamethylol melamine, 80 parts of the reaction product of 72 parts of dehydrated castor oil fatty acids, 28 parts of the dimer acids of dehydrated castor oil fatty acids and styrene reacted in a sufficient quantity to provide a mol/mol ratio. The charge is blended together and a sufficient quantity of ammonium hydroxide is added, calculated on stoichiometrical basis, to ammoniate substantially all the carboxyl groups in the acid compound of the resinous material. Films were drawn down again as before and baked for 30 minutes at 350° F. and again displayed excellent resistance to gasoline softening, sodium hydroxide resistance, very good acetic acid resistance and excellent properties in the water bath.

*Example 4*

Into a suitable mixing vessel as before, there is introduced 255 parts of water, 20 parts of hexamethyl ether of hexamethylol melamine and 80 parts of the ammoniated reaction product of dehydrated castor oil fatty acids and vinyl toluene in a mol ratio of 1:1 with the additional modification that of the total amount of vinyl toluene present, there was added additionally 10% of divinyl benzene. The vinyl toluene fatty acid reaction product had been post-bodied as in Example 2. Films drawn down therefrom displayed good to excellent resistance to xylol, gasoline, and acetic acid.

*Example 5*

Into a suitable mixing vessel as before there is introduced 222 parts of water, 20 parts of hexamethylether of hexamethylol melamine, 80 parts of tall oil fatty acids (doubly distilled) coreacted with vinyl toluene on a mol ratio of 1:1 containing 10% of divinyl benzene based on the total weight of vinyl toluene. After the components had been mixed thoroughly, a sufficient amount of ammonium hydroxide, calculated on a stoichiometrical basis, was added and it substantially completely ammoniated the tall oil fatty acid fraction moiety in the vinyl toluene reaction product. Films were drawn down on glass plates and steel panels baked at 350° F. for about 30 minutes and again displayed good to excellent properties with respect to gasoline properties, xylol resistance, sodium hydroxide resistance, and acetic acid resistance. The adhesion as displayed by a knife-scratch test was very good to excellent.

The compositions of the present invention may and frequently will be shipped without benefit of any water although for ultimate use, it may be preferred to dilute the 100% solid solution of the resinous composition for application, particularly if one engages in a spraying type of painting operation where rather low viscosities are utilized. As a consequence, the compositions of the present invention may be 100% solids or diluted with enough water to provide a 5% solids, 20% solids, 40% solids or even higher solids content coating compositions, depending on the desired use.

I claim:

1. A composition of matter comprising a mixture of (A) from about 10% to about 50% by weight of a water dispersible polymethyl ether of polymethylol melamine and (B) correspondingly from about 90% to 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms.

2. A composition of matter comprising a mixture, in aqueous dispersion, of (A) from about 10% to about 50% by weight of a water dispersible polymethyl ether of polymethylol melamine and (B) correspondingly from about 90% to 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms.

3. A composition of matter comprising a mixture, in aqueous dispersion, of (A) from about 10% to about 50% by weight of the hexamethyl ether of hexamethylol melamine and (B) correspondingly from about 90% to about 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms.

4. A composition of matter comprising a mixture, in aqueous dispersion, of (A) from about 10% to about 50% by weight of a water dispersible polymethyl ether of polymethylol melamine and (B) correspondingly from about 90% to 50% by weight of an ammoniated salt of a dimer of an unsaturated fatty acid having from 14 to 24 carbon atoms.

5. A composition of matter comprising a mixture, in an aqueous dispersion, of (A) from about 10% to about 50% by weight of a water dispersible polymethyl ether of polymethylol melamine and (B) correspondingly from about 90% to about 50% by weight of an ammoniated salt of an addition reaction product of a polymerizable styrene and an unsaturated fatty acid having from 14 to 24 carbon atoms.

6. A composition of matter comprising a mixture, in an aqueous dispersion, of (A) from about 10% to about 50% by weight of hexamethyl ether of hexamethylol melamine and (B) correspondingly from about 90% to about 50% by weight of an ammoniated salt of a dimer of an unsaturated fatty acid having from 14 to 24 carbon atoms.

7. A composition of matter comprising a mixture, in an aqueous dispersion, of (A) from about 10% to about 50% by weight of hexamethyl ether of hexamethylol melamine and (B) correspondingly from about 90% to about 50% by weight of an ammoniated salt of an addition reaction product of a polymerizable styrene and an unsaturated fatty acid having from 14 to 24 carbon atoms.

8. A composition of matter comprising a mixture, in an aqueous dispersion, of (A) from about 10% to about 50% by weight of hexamethyl ether of hexamethylol melamine and (B) correspondingly from about 90% to about 50% by weight of an ammoniated salt of an addition reaction product of the fatty acids of dehydrated castor oil and methyl styrene.

9. A composition of matter comprising a mixture, in an aqueous dispersion, of (A) from about 10% to about 50% by weight of hexamethyl ether of hexamethylol melamine and (B) correspondingly from about 90% to about 50% by weight of an ammoniated salt of an addition reaction product of the fatty acids of dehydrated castor oil and styrene.

10. A composition of matter comprising a mixture, in an aqueous dispersion, of (A) from about 10% to about 50% by weight of hexamethyl ether of hexamethylol melamine and (B) correspondingly from about 90% to about 50% by weight of an ammoniated salt of tall oil fatty acids and styrene addition reaction product.

11. A composition of matter comprising a mixture, in an aqueous dispersion, of (A) from about 10% to about 50% by weight of hexamethyl ether of hexamethylol melamine and (B) correspondingly from about 90% to about 50% by weight of an ammoniated salt of a dimer of linoleic acid.

References Cited in the file of this patent

UNITED STATES PATENTS

| | | |
|---|---|---|
| 2,681,894 | Hoenel | June 22, 1954 |
| 2,853,459 | Christenson et al. | Sept. 23, 1958 |
| 2,871,209 | Shelley | Jan. 27, 1959 |